(12) United States Patent
Tanaka et al.

(10) Patent No.: US 6,914,940 B2
(45) Date of Patent: Jul. 5, 2005

(54) DEVICE FOR IMPROVING VOICE SIGNAL IN QUALITY

(75) Inventors: Masato Tanaka, Tokyo (JP); Eiji Shinsho, Tokyo (JP); Meizhong Wang, Tokyo (JP); Yoshinori Shinohara, Tokyo (JP); Kazuhiko Seki, Tokyo (JP)

(73) Assignee: Uniden Corporation, Tokyo (JP)

( * ) Notice: Subject to any disclaimer, the term of this patent is extended or adjusted under 35 U.S.C. 154(b) by 668 days.

(21) Appl. No.: 09/739,266

(22) Filed: Dec. 19, 2000

(65) Prior Publication Data

US 2002/0131513 A1 Sep. 19, 2002

(30) Foreign Application Priority Data

Jun. 23, 2000 (JP) .................................... 2000-189092

(51) Int. Cl.[7] ................................................ H04B 1/10
(52) U.S. Cl. ...................... 375/254; 375/217; 455/212; 455/219
(58) Field of Search ................................ 375/242, 244, 375/254, 285, 243, 318, 330, 217; 455/212, 213, 214, 218, 222, 223, 219

(56) References Cited

U.S. PATENT DOCUMENTS

| | | | |
|---|---|---|---|
| 5,319,573 A | * | 6/1994 | Corleto et al. ............... 700/280 |
| 5,535,299 A | * | 7/1996 | Riedel ......................... 704/212 |
| 5,598,430 A | * | 1/1997 | Hachisuka et al. ........... 375/216 |
| 5,697,189 A | * | 12/1997 | Miller et al. .................. 52/79.9 |
| 5,768,291 A | * | 6/1998 | Kelton et al. ................. 714/746 |
| 5,781,570 A | * | 7/1998 | Hattori ......................... 714/807 |
| 5,799,039 A | * | 8/1998 | Laird et al. ................... 375/244 |
| 5,802,076 A | * | 9/1998 | Weigand et al. .............. 714/747 |
| 6,574,769 B1 | * | 6/2003 | Ramaswamy et al. ....... 714/776 |
| 6,578,162 B1 | * | 6/2003 | Yung ........................... 714/708 |
| 6,671,503 B1 | * | 12/2003 | Niwamoto ................... 455/212 |

OTHER PUBLICATIONS

"A Quantitative Speech Quality Measurement for Indoor Digital Wireless Audio Communication System,", Meizhong Wang, et al., 1999, Tokyo Research & Development Center, Uniden Corporation, p. 304.

"A Voice Quality Improvement of Indoor Digital Wireless Communication Systems," Tanaka, et al., 1999, Tokyo Research & Development Center, Uniden Corporation, p. 303.

"A Voice Quality Improvement Scheme Based on the Adaptive Speed Control Factor of ADPCM Decoder," 2000, Tokyo Research & Development Center, Uniden Corporation, p. 307.

* cited by examiner

*Primary Examiner*—Mohammad H. Ghayour
*Assistant Examiner*—Khanh Cong Tran
(74) *Attorney, Agent, or Firm*—McDermott Will & Emery LLP

(57) ABSTRACT

Provided is a device for improving voice signal in quality by discriminating a radio environment of a signal transmission path and detecting a click noise. The device for improving voice signal in quality calculates an average value for a short interval of a received ADPCM code, identifies from such average value the nature of a radio environment of a signal transmission path, and considers that a click noise is occurred when the average value exceeds a threshold value assigned radio environment. The present invention comprises a click noise detector (22) for outputting a click noise detecting signal, and a click noise suppressing circuit for suppressing the click noise by setting the velocity coefficient of an ADPCM decoder (21) as "0" for a frame in which a frame error detecting signal, which represents the detection of a frame error of the received ADPCM code, and a click noise detecting signal are both detected.

8 Claims, 3 Drawing Sheets

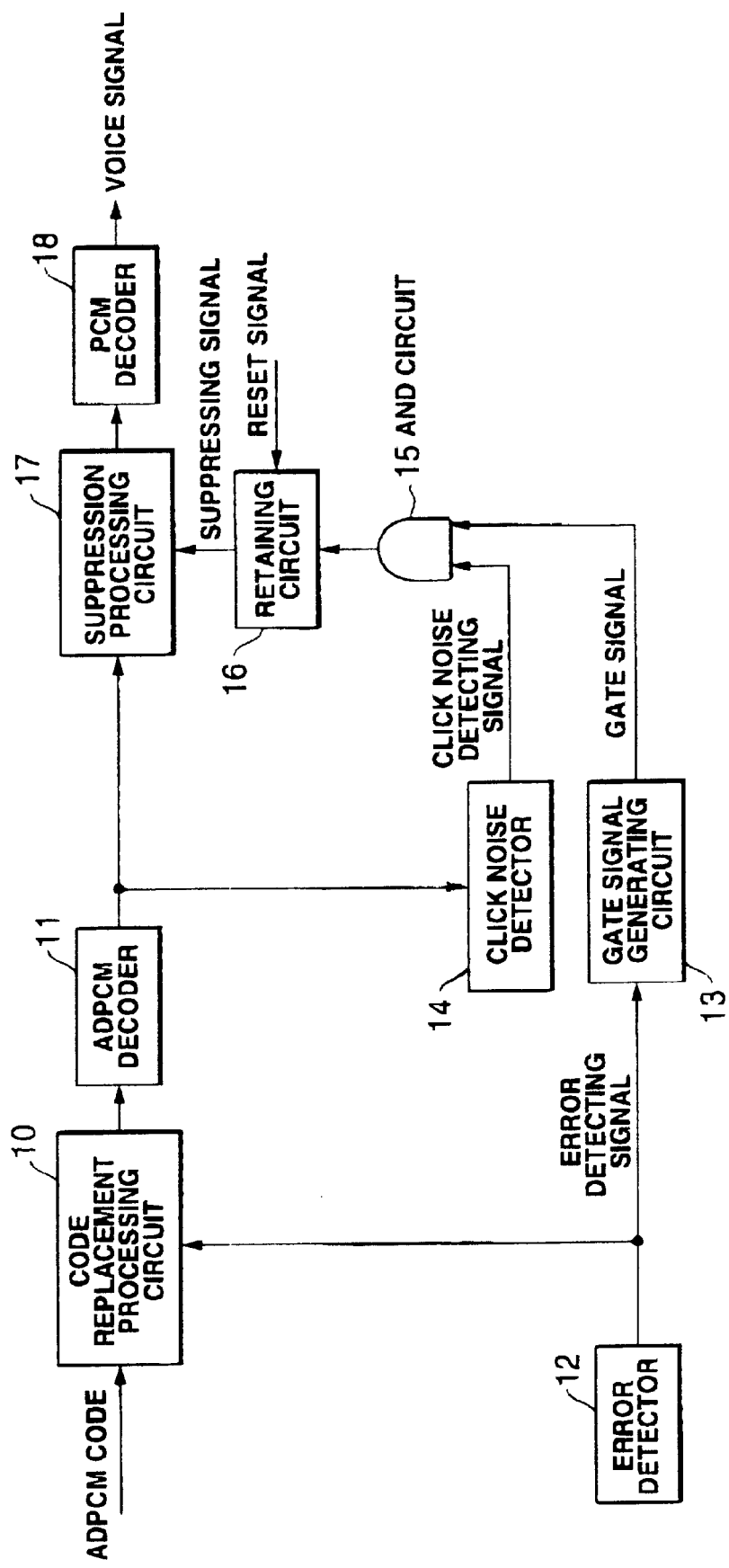

DEVICE FOR IMPROVING VOICE SIGNAL IN QUALITY

BACKGROUND OF THE INVENTION

1. Field of the Invention

The present invention relates to technology of improving voice signal in quality suitable for a radio environment of a signal transmission path in an Adaptive Differential Pulse Code Modulation (ADPCM) coding system utilized for voice communication such as digital mobile communication.

2. Description of the Related Art

In voice signal coding processing with the ADPCM system provided for in ITU-T Recommendation G. 7 26, a current input signal is predicted from a past input signal, and the difference between the predicted value and the actual value is quantized and transmitted as an ADPCM code. When the ADPCM code is erroneously transmitted, in a voice communication using the ADPCM coding system, a click noise (allophone) is occurred upon converting the ADPCM code into a PCM code with an ADPCM decoder. Here, a device for compensating such transmission error of a code will be required when such voice signal coding processing is used for digital mobile communication, etc.

Japanese Patent Laid-Open Publication Hei No. 8-37504, for example, proposes a device for improving voice signal in quality as shown in FIG. 4. In FIG. 4, an error detector 12 inspects whether received ADPCM code contains any error using a Cyclic Redundancy Check (CRC), and upon an error being detected, any "0111" or "1000," which is a code presenting the maximum difference of the ADPCM code, is replaced in a code replacement processing circuit 10 to "1111," which is a code representing no difference. A gate signal generating circuit 13 is driven by an error detecting signal supplied from the error detector 12 and outputs a gate signal immediately after the frame (packet) in which such error detecting signal is generated.

Incidentally, when an error-free ADPCM code is received in the code replacing processing circuit 10, approximately 20 msec to 30 msec, which corresponds to 3 to 5 frames, is generally required to restore the normal internal status of an ADPCM decoder 11. Thus, the gate signal generating circuit 13 outputs a gate signal in a length corresponding to approximately 3 to 5 frames.

A click noise detector 14 determines an absolute value of an amplitude difference of adjacent PCM codes which are decoding outputs from the ADPCM decoder 11. And when the determined value exceeds a threshold value, the click noise detector 14 judges a click noise to be occurred and outputs a click noise detecting signal. In an AND circuit 15, an AND of the click noise detecting signal and the gate signal is obtained and a build-up thereof is retained in a retaining circuit 16. Pursuant to a suppressing signal from the retaining circuit 16, an ADPCM decoding output is suppressed in a suppression processing circuit 17 inserted in the input side of a PCM decoder 18. The retaining circuit 16 is reset by a reset signal representing the termination of the then-current frame. Accordingly, the suppressing signal will continue from the detection of the click noise until the termination of the then-current frame.

In the above device for improving voice signal in quality of the related art, however, radio environment of a signal transmission path is in no way taken into consideration in the click noise detector 14. For example, a click noise is not detected upon making a distinction between a click noise under the fading environment, which largely influences the voice signal grade, and the one under the Additive White Gaussian Noise (AGW) environment, which hardly influences the voice signal grade.

SUMMARY OF THE INVENTION

Therefore, the object of the present invention is to provide a detector for detecting a click noise upon discriminating a radio environment of a signal transmission path, and a device for improving voice signal in quality upon discriminating a radio environment of a signal transmission path.

To solve the aforementioned problem, a click noise detector of the present invention calculates an average value for a short interval of a received ADPCM code, identifies from the average value the nature of a radio environment of the signal transmission path, and considers that a click noise is occurred when the average value exceeds a threshold value assigned radio environment. According to this structure, a click noise can be detected upon making a distinction between a fading environment and an Additive White Gaussian Noise (AWGN) environment.

The device for improving voice signal in quality of the present invention comprises the click noise detector and a click noise suppressing circuit for suppressing a click noise detected by the click noise detector. For example, when a frame error is detected in the frame which the occurrence of a click noise is recognized by the click noise detector, the click noise suppressing circuit may suppress such click noise occurred in the frame by changing the internal coefficient of an ADPCM decoder. The click suppressing circuit may also suppress a click noise in the frame which such click noise is detected using a muting system.

BRIEF DESCRIPTION OF THE DRAWINGS

FIG. 4 is a circuit diagram illustrating a conventional device for improving voice signal in quality.

DESCRIPTION OF THE PREFERRED EMBODIMENTS

An embodiment of the present invention is now described with reference to the respective drawings.

Figure 1:
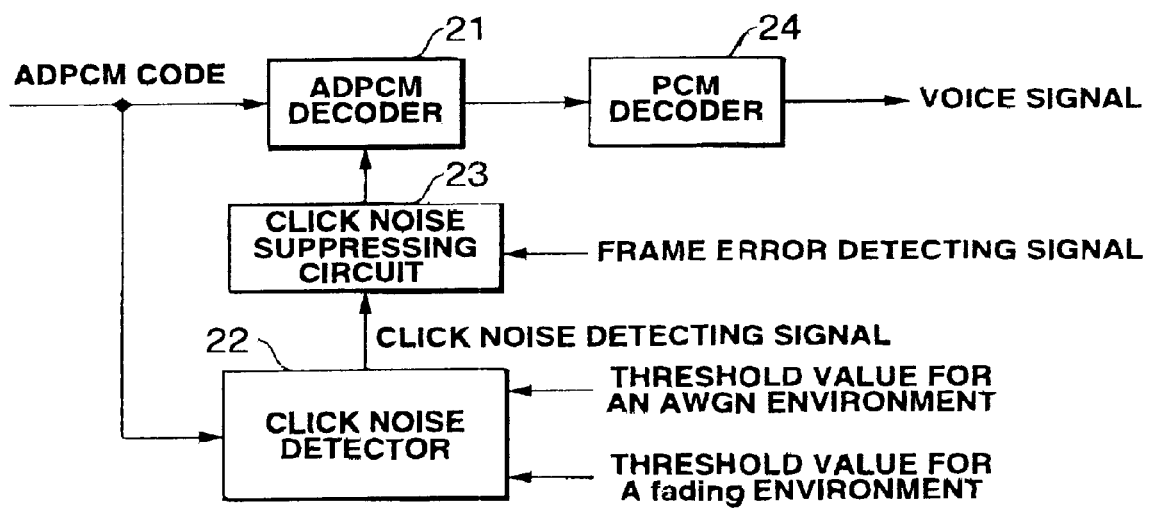
FIG. 1 is a circuit diagram illustrating a device for improving voice signal in quality of this embodiment.

FIG. 1 is a circuit diagram of a device for improving voice signal in quality of the present invention. In FIG. 1, a received ADPCM code of 32 kbps is supplied to an ADPCM decoder 21 and a click noise detector 22. The click noise detector 22 calculates an average value D (k) for a short interval of an ADPCM code and discriminates whether the radio environment is a fading environment or an AWGN environment. Provided that a received ADPCM code at time k is I (k) and the average value for a short interval thereof is D (k), D (k) can be obtained according to the formula below.

$$D(k)=\alpha D(k-1)+(1-\alpha)F(I(k)) \qquad (1)$$

Here, I (k) is the one which a differential signal between a PCM signal and a predicted signal is converted into a logarithm which of the base is 2, normalized using a scale factor and coded in 4 bits according to the translation table of a quantizer. That is, as shown in Table 1, function F (x) has the following values in view of |x|.

TABLE 1

| \|x\| | 7 | 6 | 5 | 4 | 3 | 2 | 1 | 0 |
|---|---|---|---|---|---|---|---|---|
| F (x) | 7 | 3 | 1 | 1 | 1 | 0 | 0 | 0 |

Figure 2:
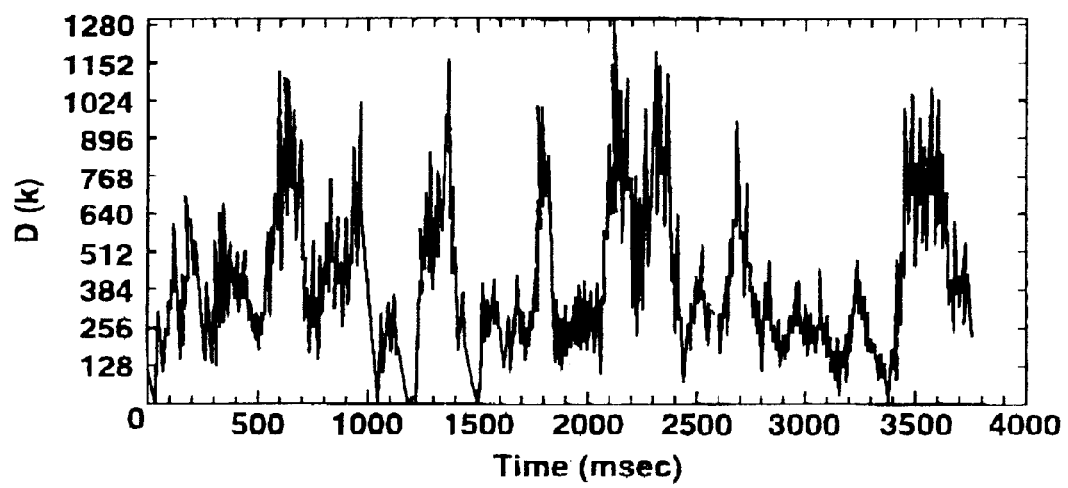
FIG. 2 is a graph indicating the value of D (k) under a fading environment.
Figure 3:
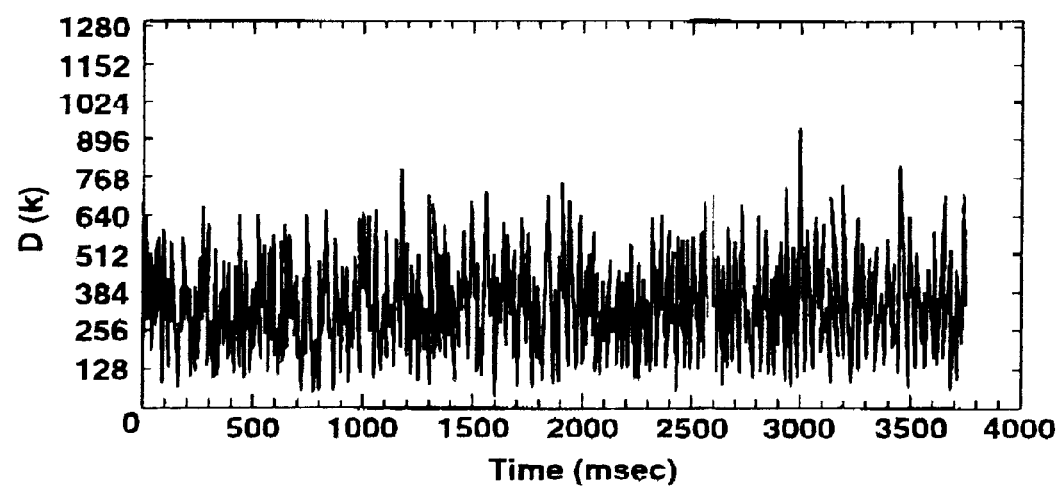
FIG. 3 is a graph indicating the value of D (k) under an AWGN environment.

When the radio environment is a fading environment, as shown in FIG. 2, the value of D (k) becomes larger, and when it is an AWGN environment, as shown in FIG. 3, the value of D (k) becomes smaller. Here, when a radio environment is a fading environment, a relatively large value is set as the threshold value for detecting a click noise suitable for the fading environment, and when it is an AWGN environment, a relatively small value is set as the threshold value for detecting a click noise suitable for the AWGN environment.

The click noise detector 22 seeks D (k) with formula (1) from a received ADPCM code, and identifies from D (k) whether the radio environment is a fading environment or an AWGN environment as well as whether or not such D (k) exceeds a threshold value predetermined for each environment. Upon the radio environment being judged as a fading environment, for example, when it is detected that the value of D (k) exceeds a threshold value for a fading environment, a click noise is considered generated and a click noise detecting signal is supplied to a click noise suppressing circuit 23.

Further, an error detecting circuit (not shown) uses a CRC to detect errors in the frame of the received ADPCM code, and a frame error detecting signal which indicates the occurrence of an error in the frame is supplied to the click noise suppressing circuit 23. The click noise suppressing circuit 23, upon detecting both a click noise detecting signal and a frame error detecting signal, sets the velocity coefficient in the ADPCM decoder as "0." This enables the suppression of click noise occurred in the frame pursuant to an erroneous transmission in the radio zone. The received ADPCM code is converted with the ADPCM decoder 21 into a PCM code of 64 kbps and this PCM code is converted with a PCM decoder 24 into a voice signal.

Furthermore, in the above description, although the click noise detector 22 calculates an average value for a short interval of the received ADPCM code, and considers that a click noise is occurred when such average value exceeds a predetermined threshold value corresponding to the radio environment, it is not limited to this. For example, the click noise detector may calculate the moving average for a short interval of the received ADPCM signal, and consider that a click signal is occurred when such moving average value exceeds a predetermined threshold value corresponding to the radio environment.

In addition to the aforementioned system, a muting system for replacing an ADPCM code sequence with a code sequence "1111," which indicates no difference, may also be used as a system for suppressing the detected click noise.

According to the present invention, the nature of a radio environment of a signal transmission path can be identified and a click noise can be suppressed in consideration of the characteristic of the radio environment. Thus, the voice signal can be superiorly upgraded.

What is claimed is:

1. A click noise detector, comprising:
   a calculator for calculating an average value for a short interval of a received ADPCM code;
   a radio environment identifying unit for identifying the nature of a radio environment of a signal transmission path based on said average value for a short interval; and
   a click noise detecting unit, upon said average value for a short interval exceeding a threshold value assigned to each radio environment, judging that a click noise has occurred.

2. A click noise detector according to claim 1, wherein said radio environment identifying unit discriminates between a fading environment and an Additive White Gaussian Noise environment, based on said average value for a short interval.

3. A device for improving voice signal in quality, comprising:
   a click noise detector according to claim 1; and
   a click noise suppressing circuit for suppressing a click noise detected by said click noise detector.

4. A device for improving voice signal in quality according to claim 3, further comprising an ADPCM decoder for decoding a received ADPCM code,
   wherein, when a frame error is detected for a frame for which said click noise detector judged that a click noise has occurred, said click suppressing circuit suppresses said click noise occurred in said frame by changing the internal coefficient of an ADPCM decoder.

5. A device for improving voice signal in quality according to claim 3, wherein, for a frame for which said click noise detector judged that a click noise has occurred, said click noise suppressing circuit suppresses said click noise that occurred in said frame using a muting system.

6. A device for improving voice signal in quality, comprising:
   a click noise detector according to claim 2; and
   a click noise suppressing circuit for suppressing a click noise detected by said click noise detector.

7. A device for improving voice signal in quality according to claim 6, further comprising an ADPCM decoder for decoding a received ADPCM code,
   wherein, when a frame error is detected for a frame for which said click noise detector judged that a click noise has occurred, said click suppressing circuit suppresses said click noise occurred in said frame by changing the internal coefficient of an ADPCM decoder.

8. A device for improving voice signal in quality according to claim 6, wherein, for a frame for which said click noise detector judged that a click noise has occurred, said click noise suppressing circuit suppresses said click noise that occurred in said frame using a muting system.

* * * * *